US010659470B2

(12) United States Patent
McCarty et al.

(10) Patent No.: US 10,659,470 B2
(45) Date of Patent: *May 19, 2020

(54) METHODS AND SYSTEMS FOR ESTABLISHING COMMUNICATION WITH USERS BASED ON BIOMETRIC DATA

(71) Applicant: Rovi Guides, Inc., San Jose, CA (US)

(72) Inventors: Michael McCarty, Agoura Hills, CA (US); Glen E. Roe, Simi Valley, CA (US)

(73) Assignee: ROVI GUIDES, INC., San Jose, CA (US)

(*) Notice: Subject to any disclaimer, the term of this patent is extended or adjusted under 35 U.S.C. 154(b) by 62 days.

This patent is subject to a terminal disclaimer.

(21) Appl. No.: 15/928,011

(22) Filed: Mar. 21, 2018

(65) Prior Publication Data

US 2018/0278618 A1    Sep. 27, 2018

Related U.S. Application Data

(63) Continuation of application No. 14/265,681, filed on Apr. 30, 2014, now abandoned.

(51) Int. Cl.
    *G06F 21/00*    (2013.01)
    *H04L 29/06*    (2006.01)
    *G06F 21/32*    (2013.01)

(52) U.S. Cl.
    CPC ............ *H04L 63/102* (2013.01); *G06F 21/32* (2013.01); *H04L 63/0861* (2013.01)

(58) Field of Classification Search
    CPC ... H04L 63/102; H04L 63/0861; G06F 21/32; H04N 21/4882; H04N 21/4788; H04N 21/4415; H04N 21/42201; G06K 9/00885; A61B 5/74; A61B 5/0002
    See application file for complete search history.

(56) References Cited

U.S. PATENT DOCUMENTS

| 5,933,136 A | 8/1999 | Brown |
| 2005/0151642 A1 | 7/2005 | Tupler et al. |
| 2005/0240959 A1* | 10/2005 | Kuhn ................ H04N 7/163 725/25 |
| 2009/0064302 A1 | 3/2009 | Colella |
| 2011/0209192 A1 | 8/2011 | Greer et al. |
| 2012/0002791 A1 | 1/2012 | Kraus et al. |
| 2012/0122420 A1 | 5/2012 | Franz |
| 2012/0239173 A1* | 9/2012 | Laikari ............. A61B 5/1112 700/91 |
| 2013/0047229 A1 | 2/2013 | Hoefel et al. |
| 2014/0059066 A1* | 2/2014 | Koloskov ........... H05K 7/02 707/758 |
| 2014/0096152 A1 | 4/2014 | Ferens et al. |
| 2014/0113593 A1 | 4/2014 | Zhou |

(Continued)

FOREIGN PATENT DOCUMENTS

WO    WO 96-14627    5/1996

*Primary Examiner* — Kendall Dolly
(74) *Attorney, Agent, or Firm* — Haley Guiliano LLP

(57) ABSTRACT

Methods and systems are disclosed herein for establishing communication with users based on biometric data. For example, in response to determining that a user has a particular biometric state, the media guidance application may present an option to contact another user that is associated with that biometric state.

20 Claims, 6 Drawing Sheets

(56) References Cited

U.S. PATENT DOCUMENTS

2014/0223462 A1* 8/2014 Aimone ............... A61B 5/0476
 725/10
2015/0135284 A1 5/2015 Bogard
2015/0161876 A1 6/2015 Castillo

* cited by examiner

METHODS AND SYSTEMS FOR ESTABLISHING COMMUNICATION WITH USERS BASED ON BIOMETRIC DATA

CROSS-REFERENCE TO RELATED APPLICATION

This application is a continuation of U.S. patent application Ser. No. 14/265,681, filed Apr. 30, 2014, currently pending, the disclosure of which is hereby incorporated by reference herein in its entirety.

BACKGROUND

Recent advances have allowed users to monitor biometric data in ways and in places in which they previously could not. For example, mobile technology allows a user to monitor his or her heart rate, blood pressure, and even the number of steps that the user takes during a given day. Furthermore, mobile technology also allows users to access media in ways and in places in which they previously could not. Despite the unfettered access to media, in some cases, restricting access to media is beneficial to one or more users. However, given the variety of circumstances that may arise, restrictions on media may not be appropriate in all scenarios.

SUMMARY

Accordingly, methods and systems are disclosed herein for encouraging particular behavior or performing particular actions based on biometric data of a user. Specifically, by granting and restricting access to media and other user devices based on whether or not a user is conforming to a biometric state, a media guidance application may encourage a user to maintain or achieve the biometric state. Furthermore, in response to detecting that a particular biometric state has been achieved (or lost) the media guidance application may automatically select and/or perform one or more actions.

For example, the media guidance application may determine, based on biometric data received from a biometric monitoring device, whether or not the activities performed by the user throughout the day (e.g., whether or not the user is consuming alcohol, smoking, exercising, studying, etc.) corresponds to one or more criteria (e.g., parental control restrictions regarding the activities) associated with a rule set. If so, the media guidance application may allow a user to access particular media or use particular devices. If not, the media guidance application may automatically perform particular actions (e.g., alert a parent, call a taxi, disable a vehicle, etc.). In another example, the media guidance application may select a particular person or entity to contact in response to determining that the user has a particular biometric state.

In some aspects, the media guidance application receives a rule set associated with a desired biometric state of a user. For example, the media guidance application may receive a user input (e.g., from a parent) selecting a rule set corresponding with a specific goal (e.g., studying, exercising, not smoking, etc.) for a first user (e.g., a child).

The media guidance application may determine a media guidance application operation (e.g., associated with the goal or selected by the parent) that is associated with adherence to the rule set. For example, the media guidance application operation may include an option related to a presentation volume of content (e.g., how loud music may be played), an option related to what content, if any, can be presented (e.g., whether or not a media asset may be presented to the first user), an option related to a user device setting (e.g., whether or not a user device may be powered on), etc.

The media guidance application then cross-references the rule set with a database listing rules associated with rule sets to determine a rule that corresponds to the rule set. For example, each rule set may be associated with various rules also corresponding to fulfilment of the goal associated with the rule set. For example, if a rule set corresponds to studying for a particular amount of time, the rule set may include one or more rules indicating a level of attention, a lack of physical movement, a lack of vocal communication, etc., that must be maintained for one or more periods of time.

The media guidance application then determines a current biometric state of the user. For example, the media guidance application may receive biometric data from a biometric monitoring device that indicates one or more biometric states of the user. The media guidance application then compares the current biometric state of the user to the rule to determine whether or not the current biometric state of the user corresponds to the rule and enables (or disables) the media guidance application operation in response to determining that the current biometric state of the first user corresponds to (or does not correspond to) the rule. For example, the media guidance application may detect that a first user has a blood-alcohol level that is in violation of a rule included in the rule set, and in response the media guidance application may disable a media guidance application operation associated with unlocking a vehicle or turning the vehicle on.

In some embodiments, in response to determining that the current biometric state of the user does not correspond to the rule, the media guidance application may disable a media guidance application operation (e.g., prevent a television or telephone from being used). Alternatively or additionally, the media guidance application may transmit an alert to a remote device (e.g., associated with a parent) in response to determining that the current biometric state of the user does not correspond to the rule. For example, if the media guidance application determines that a child has an elevated heart rate and/or an elevated level of activity (e.g., indicating that the user is performing physical activity instead of studying), the media guidance application may alert a parent.

In some embodiments, the media guidance application may present a notification of a relationship between the current biometric state of the user and the rule. For example, a relationship between the current biometric state of the user and the rule (e.g., the rule that the user is currently in violation of, or a degree to which a user is violating the rule, etc.). For example, if the media guidance application determines that a user currently has an elevated heart rate in violation of a rule, the media guidance application may alert the user to violation and/or alert the user to the degree to which the heart rate of the user exceeds the rule.

In some embodiments, the media guidance application may apply the rules set based on particular conditions. For example, the rule set may be based on parental control settings entered on a remote device, may be automatically applied during a predetermined period time, or automatically applied in response to determining the user is at a predetermined location, etc.

In some embodiments, the biometric state of the user involves receiving data from a device attached to the user. For example, the biometric monitoring device may be a device worn or held by a user such as an armband, wristband, eyeglasses, or other wearable electronic device.

In some aspects, the media guidance application measures biometric data associated with a first user. For example, the media guidance application may receive data from a biometric monitoring device attached to, worn by, or held by the user. The media guidance application determines a biometric state of the user based on the biometric data. For example, the media guidance application may interpret the biometric data to determine whether or not the heart rate of the user is elevated, whether or not a user is concentrating, etc.

The media guidance application then cross-references the biometric state of the first user with a database listing a plurality of users associated with different biometric states to identify a second user associated with the first user to establish communication based on the biometric state of the first user. For example, the media guidance application may determine a particular user to contact based on the biometric state of the user. For example, if the biometric state of the user corresponds to a blood-alcohol level of 0.02 (e.g., indicating that the user has been consuming alcohol), the media guidance application may establish communication with a friend or family member of the user. If the biometric state of the user corresponds to a drop, or lack thereof, in the breath rate of the user (e.g., indicate the user has stopped breathing), the media guidance application may establish communication with a hospital. If the biometric state of the user corresponds to an increase in the heart rate of the user (e.g., indicating the user is in danger), the media guidance application may establish communication with the police.

The media guidance application then generates for display to the first user communication information associated with the second user based on the identification. For example, in response to determining a particular user or entity to contact, the media guidance application may transmit a mailing address, an e-mail address, a web-site address, a telephone number, etc. for the particular user or entity to a user device (e.g., a smartphone) detected to be associated with the user.

Additionally or alternatively, the media guidance application may generate for display a list of a plurality of users or entities each of which corresponds to the biometric state of the user. For example, in response to determining that a user is excited, the media guidance application may present a list of all of the friends of a user (e.g., as indicated by a social network associated with the user).

In some embodiments, the media guidance application may additionally establish communication with the second user in response to a user input. For example, after generating for display to the first user the communication information associated with the second user, the media guidance application may receive a user request (e.g., the selection of a "call" icon) to contact the second user. Based on this request, the media guidance application establishes communications with (e.g., calls) the second user.

In some embodiments, the media guidance application may automatically establish communication with the second user based on the biometric state of the first user. For example, the media guidance application may automatically contact a user after the communication information has been generated for display a particular amount of time. Alternatively or additionally, the media guidance application may determine whether or not to automatically contact the second user based on the biometric state of the user. For example, if the biometric state of the user indicates that the user cannot or will be inhibited from requesting to contact the second user (e.g., the user in unconscious), the media guidance application may automatically contact the second user.

In some embodiments, the media guidance application may determine a communication method for establishing communication with the second user based on an identity of the second user. For example, the media guidance application may determine that a particular user (e.g., a parent) prefers to receive communications via a telephone call, whereas a different user (e.g., a friend) prefers to receive communications via text message. Additionally or alternatively, the media guidance application may determine a communication method for establishing communication with the second user based on biometric state of the user. For example, if the biometric state of the user is not conducive to speaking (e.g., the user is inebriated), the media guidance application may determine to communicate via text message.

In some embodiments, the media guidance application may determine a message to be communicated the second user based on the biometric state of the first user. For example, the media guidance application may determine to send a message inviting a user to join the first user on a jog in response to determining the user is jogging based on the biometric data.

In some embodiments, the media guidance application may measure biometric data based on a schedule (e.g., automatically measured at a predetermined time or upon detecting the first use is at a predetermined location). For example, the media guidance application may measure the biometric data of the user every hour or upon detecting the user is entering a particular location (e.g., associated with a vehicle of the user).

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
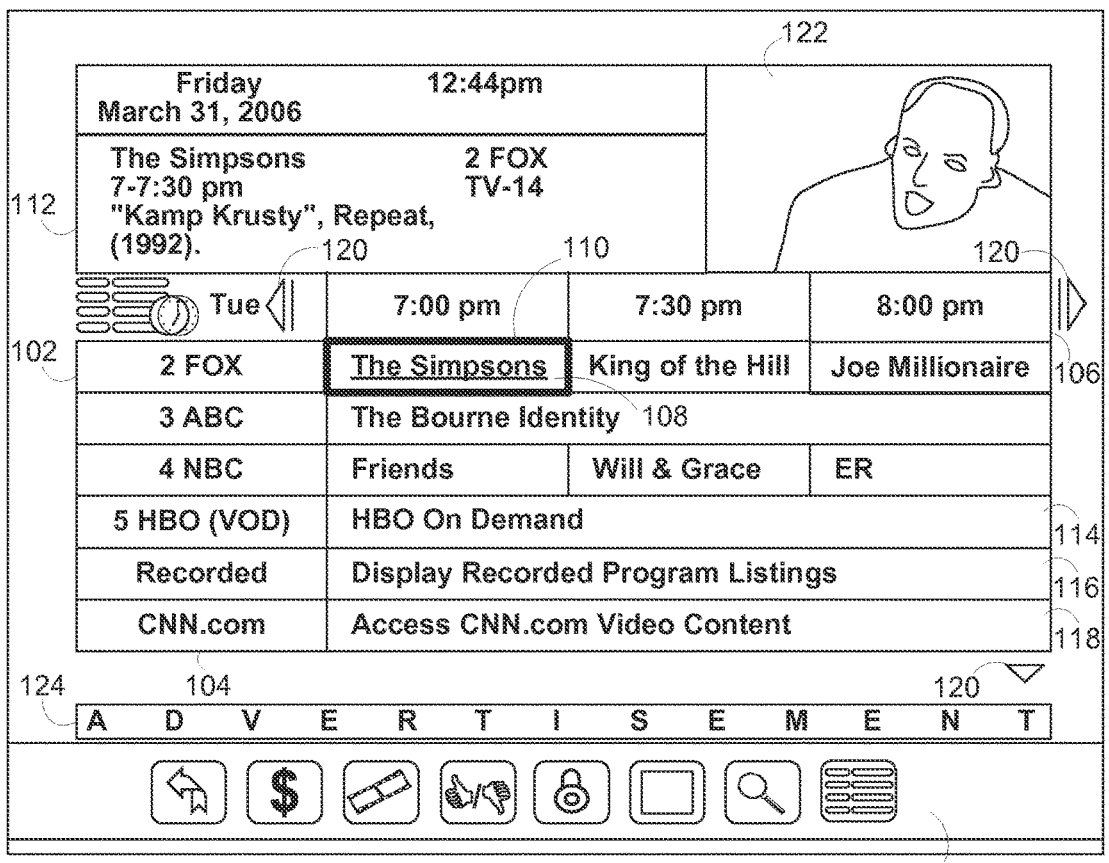
FIG. 1 shows an illustrative example of a media guidance application in accordance with some embodiments of the disclosure.

Methods and systems are disclosed herein for encouraging particular behavior or performing particular actions based on biometric data of a user. Specifically, by granting and restricting access to media and other user devices based on whether or not a user is conforming to a biometric state, a media guidance application may encourage a user to maintain or achieve the biometric state. Furthermore, in response to detecting that a particular biometric state has been achieved (or lost) the media guidance application may automatically select and/or perform one or more actions.

For example, the media guidance application may determine, based on biometric data received from a biometric monitoring device, whether or not the activities performed by the user throughout the day (e.g., whether or not the user is consuming alcohol, smoking, exercising, studying, etc.) corresponds to one or more criteria (e.g., parental control restrictions regarding the activities) associated with a rule set. If so, the media guidance application may allow a user to access particular media or use particular devices. If not, the media guidance application may automatically perform particular actions (e.g., alert a parent, call a taxi, disable a vehicle, etc.). In another example, the media guidance application may select a particular person or entity to contact in response to determining that the user has a particular biometric state.

As used herein, "a media guidance application," "interactive media guidance application," or "guidance application" refers to a form of media guidance through an interface that facilitates access to media content or performs media guidance application operations. In some embodiments, the media guidance application may be provided as an on-line application (i.e., provided on a website), or as a stand-alone application on a server, user device, etc. Various devices and platforms that may implement the media guidance application are described in more detail below. In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM"), etc.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

In some embodiments, the media guidance application receives a rule set associated with desired biometric state of a user. As used herein, a "rule set" refers to a collection of one or more rules that indicate a biometric states that corresponds to a specific goal. As used herein, a "rule" refers to a specific biometric state that corresponds to a component of the specific goal. For example, if the rule set may correspond to not to studying or concentrating on a task, a first rule of the rule set may indicate a particular heart rate the user must maintain (e.g., indicating the user is not performing physical activities instead of sitting and studying), a second rule of the rule set may indicate a particular perspiration level that must be maintained (e.g., indicating the user is not performing physical activities instead of sitting and studying), a third rule of the rule set may indicate a particular attention level that the user must maintain (e.g., indicating the user is concentrating instead of daydreaming). In another example, if the rule set corresponds to acceptable behavior (e.g., as determined by a parental control setting), a first rule of the rule set may indicate an allowable blood-alcohol level (e.g., zero percent) and a second rule of the rule set may indicate an allowable level of nicotine (e.g., zero percent) for the user.

In some embodiments, the media guidance application may apply the rules set based on particular conditions. For example, the rule set may be based on parental control settings entered on a remote device. In another example, the rule set may be automatically applied during a predetermined period time. For example, if a user is schedule to study for the next hour, the media guidance application may apply a rule set the goal of which is to maintain conditions conducive to studying (e.g., a high level of concentration, a lack of physical movement, etc.).

In some embodiments, a rule set may be applied in response to detecting a change in biometric data. For example, in response to a user's perspiration level increasing, the media guidance application may apply a rule set associated with maintaining proper hydration in the user.

In another example, the rule set may be automatically applied in response to determining the user is at a predetermined location. For example, the media guidance application may apply a first rule set while a user is a first location (e.g., a library, school, etc.) and a different rules set while the user is a second location (e.g., a baseball field, a friend's house, etc.). The location may also be relative to a particular object. For example, the media guidance application may determine the location of an object (e.g., a vehicle associated with the user) and apply a rule set (e.g., limiting the blood-alcohol level of the user) when the user is near the location of the object.

As used herein, a "biometric state" refers to any qualitative or quantitative description of one or more biometric measurements related to a user. For example, a biometric state may describe a particular measurement (e.g., the heart bate (in beats per minute), breath rate (in breaths per minute), blood pressure (in millimeters of mercury), etc.) of a user. A biometric state may alternatively or additionally describe a characteristic of a user relative to a baseline biometric state of the user (e.g., whether or not the user has a current attention level above or below the average attention level of the user) or relative to a baseline biometric state of an average user (e.g., whether or not the perspiration level of the user as measured by skin conductance is higher or lower than an average user in similar circumstances).

The media guidance application may further interpret or express the measurements in numerous techniques such as ratios, percentages, categories (e.g., high, normal, low), or using any other technique for distinguishing one biometric state from another. For example, a quantitative heart rate measurement (e.g., in beats per minute) may be converted into a qualitative reading (e.g., such as "Good" or "Bad") when generated for display to the user.

As used herein, "a biometric measurement" refers to distinctive, measurable characteristics used to label and describe the psychological or physiological conditions of a user. For example, biometric measurements that may be received, managed, monitored, and/or shared by a media guidance application may include psychological characteristics related to the level of concentration, emotional state, mood, and/or pattern of behavior of a person, including but not limited to typing rhythm, gait, frequency of social interactions, voice tones, etc., or may include physiological characteristics related to the status and/or shape of the body such as height, weight, medical condition(s), heart rate, blood pressure, fingerprint, body mass index, glucose level, face description, DNA, palm print, hand geometry, iris recognition, retina, odor/scent, and/or any other mechanical, physical, and biochemical functions of a user, his/her organs, and the cells of which they are composed.

In some embodiments, the media guidance application may determine a psychological or physiological condition of a user based on one or more biometric measurements. For example, the media guidance application may determine the current mood of a user based on the heart rate, drowsiness level, or current brain activity of the user. In another example, the media guidance application may determine the level of attention of a user based on current brain activity, eye contact, etc. Systems and methods for determining moods, levels of attention, and other characteristics of a user based on brain activity are discussed in greater detail in connection with Klappert et al., U.S. patent application Ser. No. 14/038,158, filed Sep. 26, 2013; Klappert et al., U.S. patent application Ser. No. 14/038,046, filed Sep. 26, 2013; Klappert et al., U.S. patent application Ser. No. 14/038,171, filed Sep. 26, 2013; Klappert et al., U.S. patent application Ser. No. 14/038,257, filed Sep. 26, 2013; Klappert et al., U.S. patent application Ser. No. 14/037,984, filed Sep. 26, 2013; and Klappert et al., U.S. patent application Ser. No. 14/038,044, filed Sep. 26, 2013; which are hereby incorporated by reference herein in their entireties.

It should be noted that any embodiment associated with the receipt, management, monitoring, and/or sharing of one or more biometric measurements may also be applied to the receipt, management, monitoring, and/or sharing of one or more psychological or physiological conditions of a user.

In some embodiments, information related to biometric measurements and/or psychological or physiological conditions of a user, including any settings associated with the receipt, management, monitoring, and/or sharing of one or more biometric measurements and/or psychological or physiological conditions of the user may be stored in a user profile. User profiles may also include compilations of media content interests of the user.

The media guidance application may also determine a media guidance application operation that is associated with adherence to the rule set. As referred to herein, a "media guidance application operation" refers to any operation performed by a media guidance application. For example, a media guidance application operation may correspond to providing, receiving, and/or generating for display media assets and/or media guidance data for consumption by a user. For example, media guidance application operations include displaying media guidance data, providing options to navigate, select, and edit media guidance data or content (e.g., a media asset) associated with media guidance data, and/or manipulating a device used to access (e.g., a display device), retrieve (e.g., a server), and/or associate media guidance data with a user (e.g., a user device for monitoring brain activity).

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Other operations of a media guidance application are to play media assets and provide fast access playback operations for those media assets. As referred to herein, the phrase "fast-access playback operations" should be understood to mean any media guidance application operation that pertains to playing back a non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter or any other operation that does not play back the media asset at normal playback speed. The fast-access playback operation may be any playback operation that is not "play," where the play operation plays back the media asset at normal playback speed.

Still other operations of media guidance application may include the control of devices. For example, a media guidance application operation may include turning a device on and off, raising the volume associated with a device, adjusting the display settings of a device, assigning parental controls, transferring information (e.g., messages) from one device to another, storing and/or recording content, entering authorization information and/or payment information, etc. Additionally, the media guidance application operation may relate to the movement of the vehicle (e.g., where to, or how fast, the vehicle may move and/or whether the vehicle may move at all).

In some embodiments, a media guidance application operation may relate to a social media activity such as publicly distributing a notification and/or biometric data associated with a user. For example, the media guidance application may retrieve a list of entities such as friends (e.g., a social network buddy list), contacts (e.g., retrieved from a phone/text message/e-mail account associated with the user), and/or public services (e.g., hospitals, police departments, schools, etc.) with known associations to the user or the community of the user and generate for display communication information associated with the listed entities.

For example, in response to a particular biometric state being detected, the media guidance application may determine that the biometric data indicates that one or more friends of the user should be contacted. The media guidance application may then post messages to the social network account associated with the user or with the selected friends. The message may include a description of the biometric state and/or any other information to be shared by the user (e.g., the location of the user, the activity being performed by the user, etc.). For example, in response to determining a biometric state is in violation of a rule, the media guidance application may notify a user (or a third party) of a relationship between the biometric state and the rule (e.g., the rule of which the user is currently in violation, or a degree to which a user is violating the rule, etc.). For example, if the media guidance application determines that a user (e.g., a child) is inebriated (e.g., in violation of a rule), the media guidance application may notify a third party (e.g., a parent).

In some embodiments, the media guidance application may publicaly distribute the notification and/or media assets associated with the user via a social network. For example, in response to determining that the biometric state of a user, the media guidance application may post messages to the social network account associated with the user.

As used herein, a "social network," refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user. In such cases, classes of entities may correspond to the level of access and/or the amount or type of content associated with a first user that is accessible to a second user.

In some embodiments, the media guidance application may determine an entity (e.g., another user) to establish communication with based on the biometric data of a user. To do so, the media guidance application may retrieve contacts and/or communication information of the entities. Furthermore, the media guidance application may determine whether or not an entity is of a particular class that should be contacted based on a particular biometric state of the user. For example, the media guidance application may identify, using processing circuitry, a class of an entity based on a comparison of the entity with a contacts list associated with the user, in which the contacts list is stored in storage circuitry associated with a user device, account etc. associated with the user. As referred to herein, a "contacts list" refers to any collection of names of entities associated with a user. In some embodiments, the contacts list used may be a contacts list associated with a particular account.

In some embodiments, the media guidance application may cross-reference, using the processing circuitry, the class with a database listing biometric states associated with different classes to determine whether or not the media guidance application should generate communication information associated with the entity for display to the user based on the current biometric state of the user.

As used herein, "communication information" refers to any information used by the user or by a device associated with the user to establish communication with another entity (e.g., another user). For example, communication information may include a mailing address, an e-mail address, a web-site address, a telephone number, an IP address, etc. associated with an entity. In some embodiments, all or parts of the communication information may be generated for display to a user.

Furthermore, in some embodiments, communication information may appear as information that does not necessarily describe an address, location, or other option for contacting a user. For example, a user device associated with a user may generate for display only a name of an entity even though the media guidance application has determined a telephone number that will be contacted in response to a user selecting the displayed name. In such cases, the name of the entity may be considered the communication information.

In some embodiments, a media guidance application operation may be associated with a mobile user device. For example, the media guidance application may detect a mobile user device (or the use of a mobile device) used by or otherwise associated with a user, and, perform or restriction the media guidance application operations on that user device. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

In some embodiments, the biometric state of the user involves receiving data from a device attached to the user. For example, a user device may incorporate or have access to a biometric monitoring device which is attached to, worn by, or held by a user such as an armband, wristband, eyeglasses, or other wearable electronic device that may monitor for one or more types of biometric data as discussed above.

Figure 2:
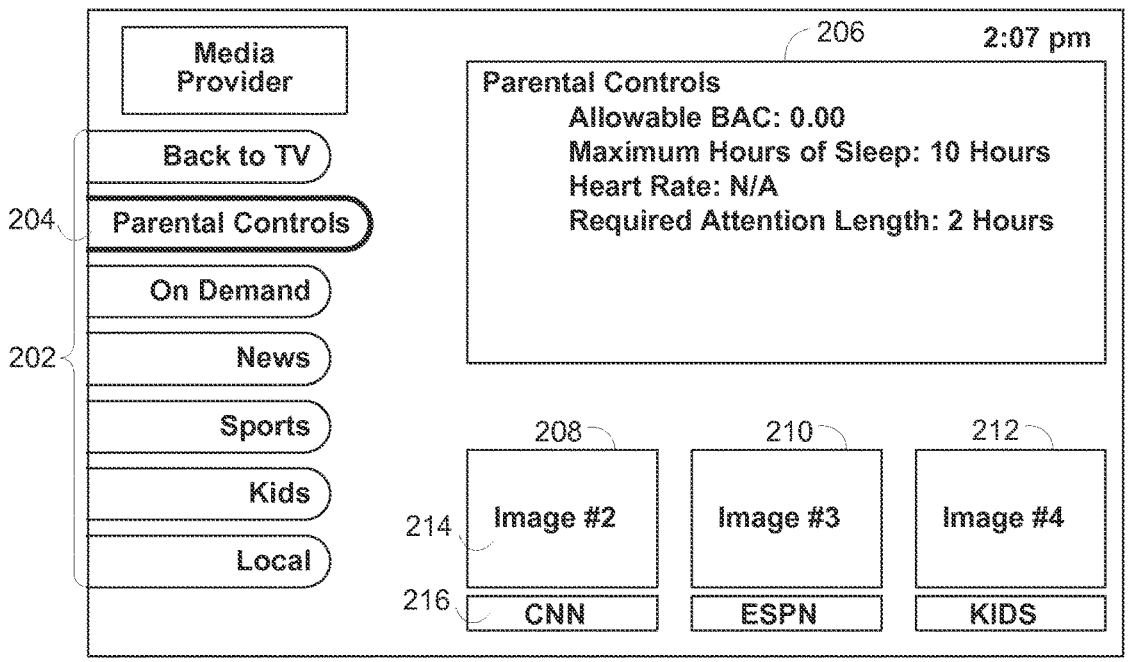
FIG. 2 shows another illustrative example of a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. For example, FIG. 1 may represent a display available to a user. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media assets, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. For example, FIG. 2 may represent a display used to select rule sets or rules associated with particular rule sets. Video mosaic display 200 includes selectable options 202 for content information organized based on content type, genre, and/or other organization criteria. In display 200, parental control option 204 is selected, thus providing information related to parental controls in window 206. For example, window 206 may indicate rules or rule sets that are currently available and/or are currently active. Through window 206, the media guidance application may also display options related to parental controls. For example, the media guidance application may allow a user to customize the rules, rule sets, and/or media guidance application operations available to a user (or not available to a user) based on a particular biometric state.

In some embodiments, a media guidance application may automatically retrieve a set of custom rules based on the demographic, geographic, familial status of a user. For example, if a user is located in the state of Kansas, the media guidance application may automatically retrieve a rule set that corresponds to the biometric regulations (e.g., allowable blood-alcohol level) associated with the state of Kansas. In another example, if a user is fifteen years old, the media guidance application may automatically retrieve a rule set that corresponds to proper etiquette for fifteen year olds (e.g., blood-alcohol level and nicotine levels of zero percent). In yet another example, if a user is part of a family grouping that has a custom rule set, the media guidance application may automatically retrieve the custom rule set in response to determining that the user is part of the family.

Display 200 also includes listings 208, 210, and 212 as program listings. For example, listings 208, 210, and 212 may correspond to media assets that are available to a user based on the current behavior of the user. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
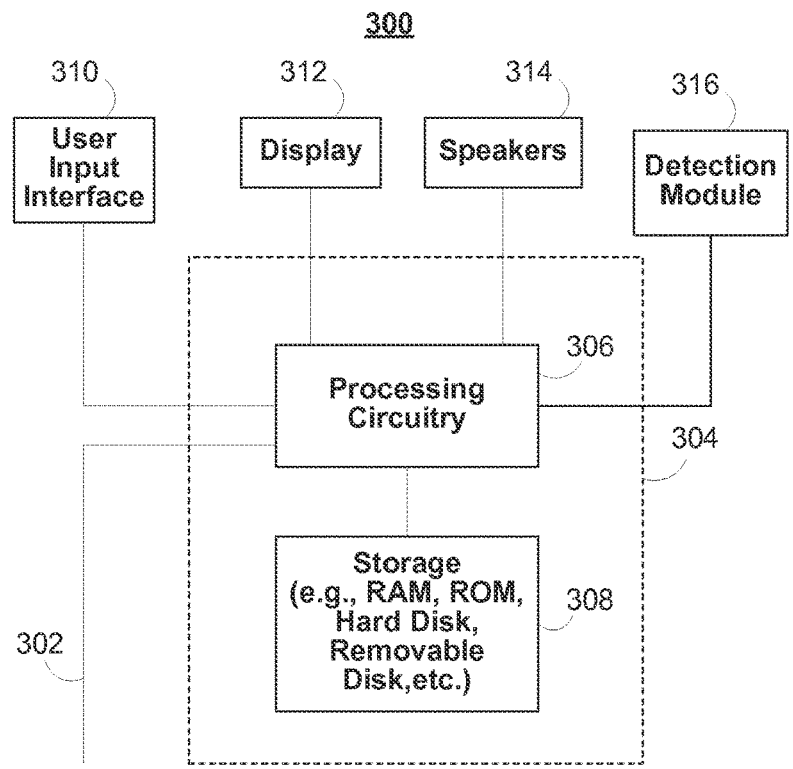
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data and guidance application data that are described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature polysilicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Detection module 316, or the detection module circuitry, may be incorporated into, coupled to, or accessible by the media guidance application (e.g., via control circuitry 304). Detection module 316 may be used to measure, monitor, identify, and determine biometric data and/or a current biometric state of a user. For example, the media guidance application may receive data describing the biometric state of a user.

For example, the media guidance application, or the user device upon which the media guidance application is implemented, may incorporate and/or have access to a plurality of sensors and/or monitoring components. In some embodiments, the media guidance application, or the user device upon which the media guidance application is implemented, may incorporate and/or have access to an electroencephalogram unit ("EEG"). An EEG measures electrical activity associated with a brain of a user. For example, an EEG may measure voltage fluctuations and/or the frequency or frequency range of voltage fluctuations generated by the brain of a user. In some embodiments, the media guidance application, or the user device upon which the media guidance application is implemented, may incorporate and/or have access to an electromyogram unit ("EMG"). An EMG measures the electrical activity of nerves controlling muscles at rest and during contraction.

In some embodiments, the media guidance application, or the user device upon which the media guidance application is implemented, may incorporate and/or have access to a heart monitor, glucose blood meter, respiratory monitors, devices for obtaining tissue, blood, and/or any other suitable samples from a user, and/or any other devices necessary for determining the biometric measurements of the user.

In some embodiments, display 200 may indicate psychological and/or physiological conditions to monitor in addition to, or as an alternative to, individual biometrics to monitor. For example, if the media guidance application monitors a mood of the user, the media guidance application may monitor multiple biometrics in order to monitor the mood. For example, the media guidance application may compare the breathing rate (e.g., determined via a respiratory monitor), blood pressure (e.g., via a blood pressure monitor), alpha wave activity (e.g., via a EKG), and muscle tension (e.g., via an EMG) to determine the particular mood a user is currently experiencing. Thus, in response to selecting to monitor a mood of the user, the media guidance application may obtain data from a plurality of devices and/or obtain a plurality of biometric measurements.

Detection module 316 may also calibrate biometric measurements based on the user. For example, the media guidance application may calibrate the various biometric measurements based on the typical measurement of the user and/or skewing caused by a particular sensor or monitoring component. For example, the media guidance application may track the biometrics of the user (e.g., in a personal log stored in storage 308), which tracks various biometrics of the user.

In some embodiments, detection module 316 may include a Global Positioning System ("GPS") detection component, which determines or receives information describing the geographic position of a user or an object associated with a user (e.g., a vehicle) for use in applying a rule set based on the location of a user.

Additionally or alternatively, the media guidance application may determine the biometric state by applying one or more content recognition techniques. For example, detection module 316 may record biometric state of the user and analyze the biometric state of the user for one or more indicates of a biometric state or a particular biometric measurement. For example, the media guidance application (e.g., via control circuitry 304) may use a content recognition module or algorithm to generate data describing the context, content, and/or any other data necessary for determining a biometric state or a particular biometric measurement. For example, the content recognition module may use object recognition techniques such as edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to analyze recorded behavior of a user. For example, the media guidance application may receive data in the form of a video. The video may include a series of frames. For each frame of the video, the media guidance application may use a content recognition module or algorithm to determine the objects (e.g., people, places, things, etc.) in each of the frames or series of frames, which may be used to determine biometric state or a particular biometric measurement. For example, the media guidance application may analyze each frame of the video to determine the number of times that a user breaths (e.g., by detecting the rise and fall of the chest of a user) over the length of the video. The media guidance application may then compare this determination (e.g., the breath rate of the user) to the one or more rules or rule sets to determine if the current biometric state (e.g., corresponding to the current breath rate) corresponds to one or more rules or rule sets.

In some embodiments, the content recognition module or algorithm may also include speech recognition techniques, including, but not limited to, Hidden Markov Models, dynamic time warping, and/or neural networks (as described above) to translate spoken words into text and/or processing audio data. The content recognition module may also combine multiple techniques to determine biometric state or a particular biometric measurement. For example, if the media guidance application determines the user is out or breath or laboring to breath based on sounds coming from the user, the media guidance application may use this information to determine the current biometric state or a particular biometric measurement of the user.

In addition, the media guidance application may use multiple types of optical character recognition and/or fuzzy logic, for example, when processing keyword(s) retrieved from data (e.g., textual data, translated audio data, user inputs, etc.) describing biometric state or a particular biometric measurement (or when cross-referencing various types of data in databases). For example, if the particular data received is textual data, using fuzzy logic, the media guidance application (e.g., via a content recognition module or algorithm incorporated into, or accessible by, the media guidance application) may determine two fields and/or values to be identical even though the substance of the data or value (e.g., two different spellings) is not identical.

In some embodiments, the media guidance application may analyze particular received data of a data structure or media asset frame for particular values or text using optical character recognition methods described above in order to determine a characteristic of a media asset. For example, the media guidance application may process the spoken words of the user to find particular keywords that may be indicative of a current biometric state or a particular biometric measurement.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
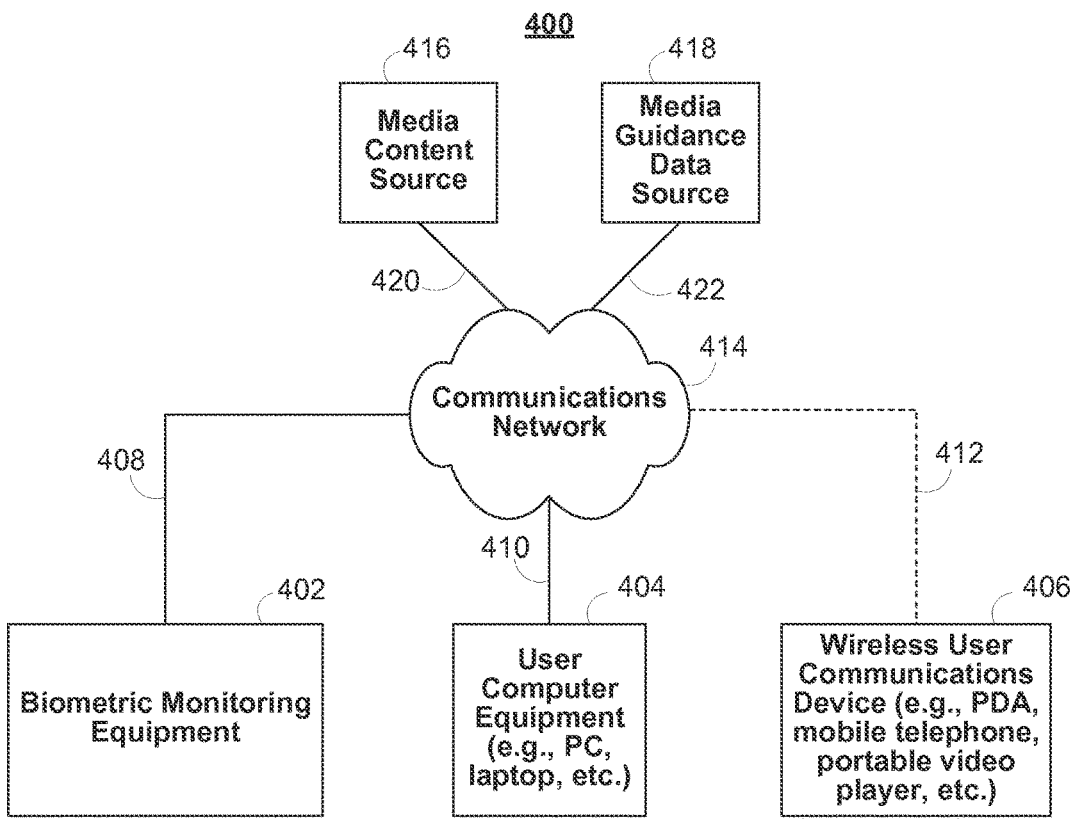
FIG. 4 is a block diagram of an illustrative media system in accordance with some embodiments of the disclosure.

User equipment device 300 of FIG. 3 can be implemented in system 400 of FIG. 4 as biometric monitoring equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below. In some embodiments, user equipment may refer to components incorporated into, coupled to, or accessible by a vehicle.

A user equipment device utilizing at least some of the system features described above in connection with FIG. 3 may not be classified solely as biometric monitoring equipment 402, user computer equipment 404, or a wireless user communications device 406. For example, biometric monitoring equipment 402 may, like some user computer equipment 404, be Internet-enabled allowing for access to Internet content, while user computer equipment 404 may, like some biometric monitoring equipment 402, include a detection module (e.g., detection module 316 (FIG. 3)) for detecting a current biometric state or a particular biometric measurement. The media guidance application may have the same layout on various different types of user equipment or may be tailored to the display capabilities of the user equipment.

For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., biometric monitoring equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home and vehicular devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, biometric monitoring equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as biometric monitoring equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
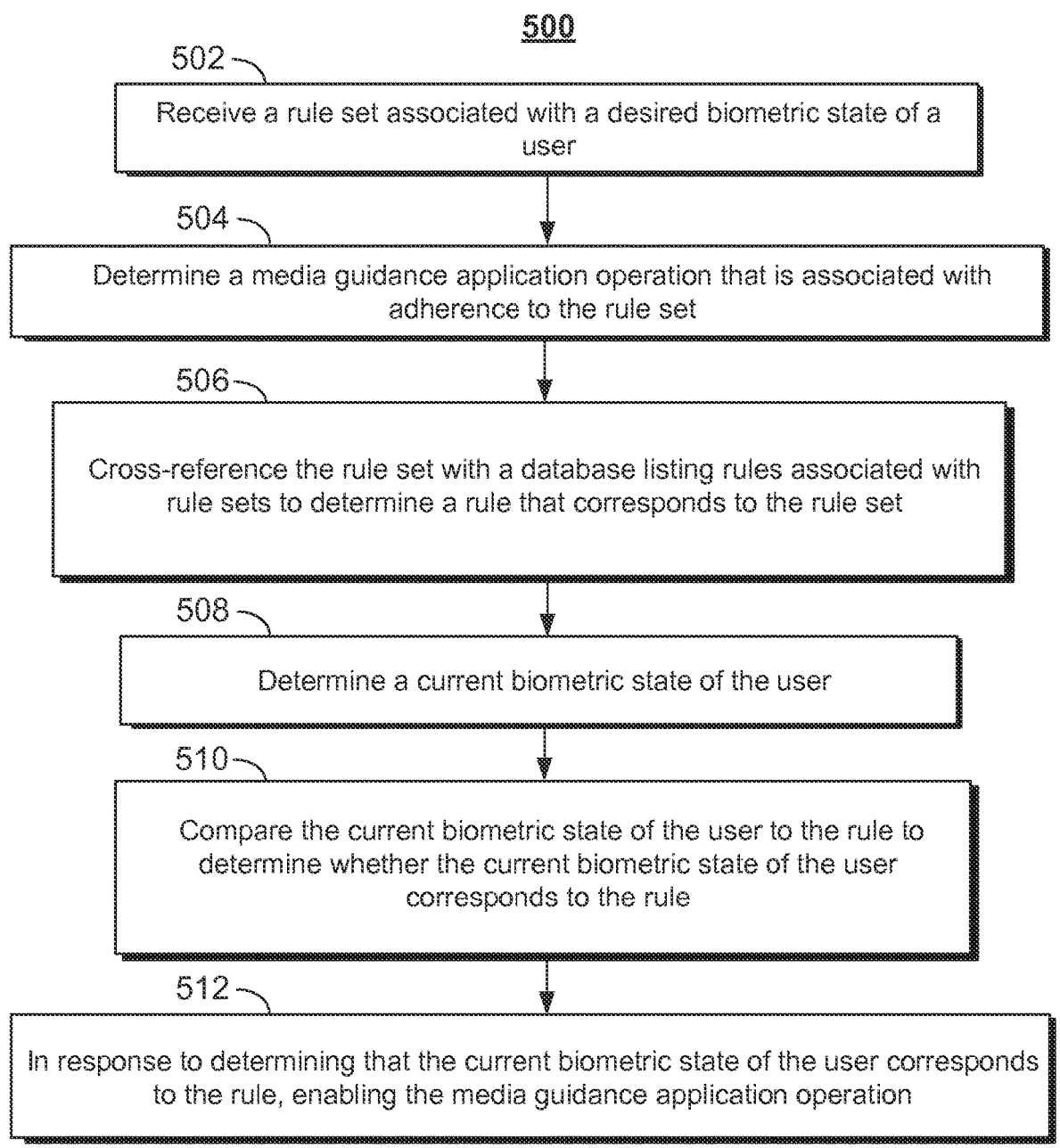
FIG. 5 is a flowchart of illustrative steps for enabling a media guidance application operation in response to determining that the current biometric state of a user corresponds to a rule in accordance with some embodiments of the disclosure.
Figure 6:
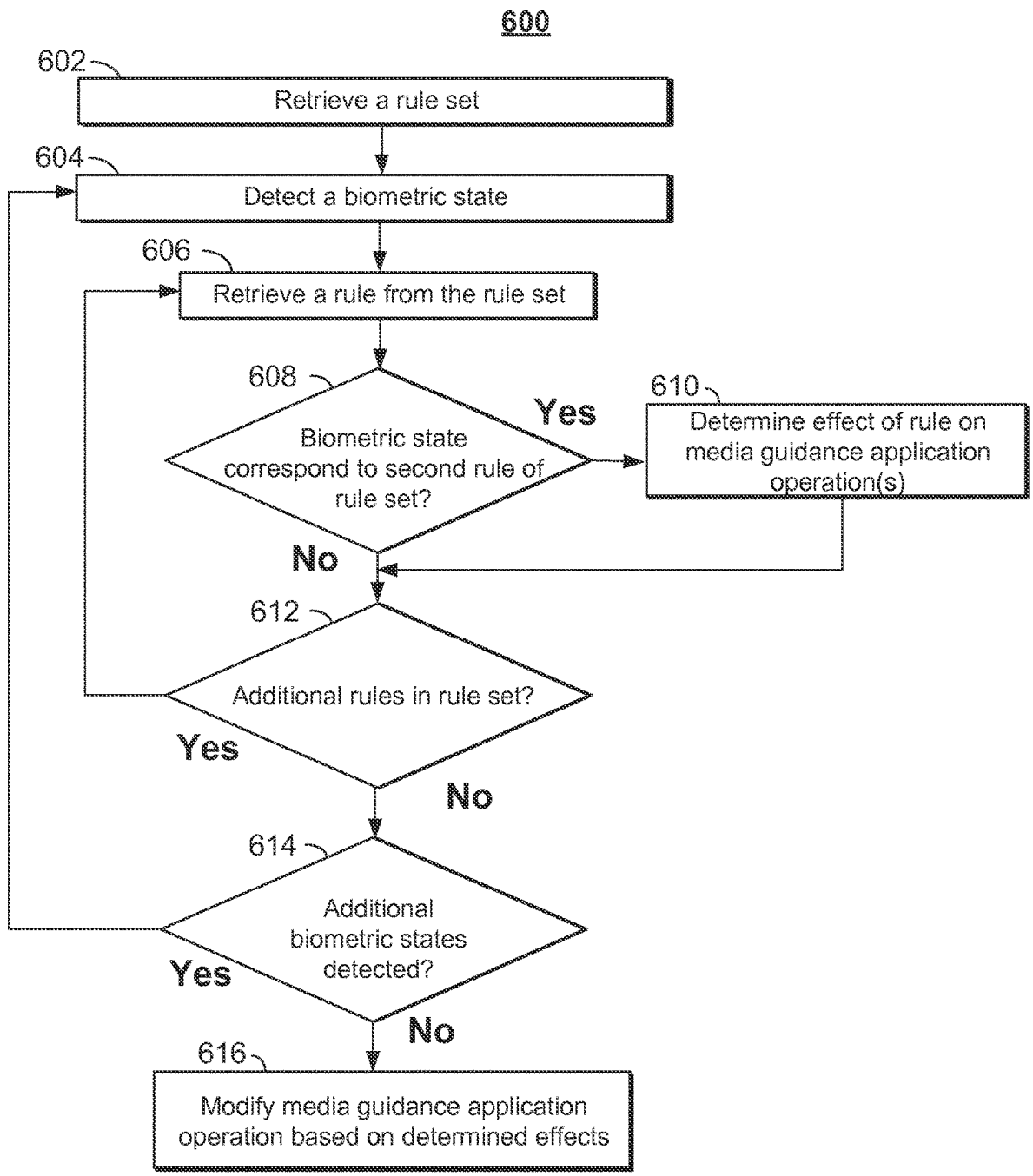
FIG. 6 is a flowchart of illustrative steps for modifying media guidance application operation(s) based on determined effects of the current biometric state of a user corresponding to one or more rules in a rule set in accordance with some embodiments of the disclosure.
Figure 7:
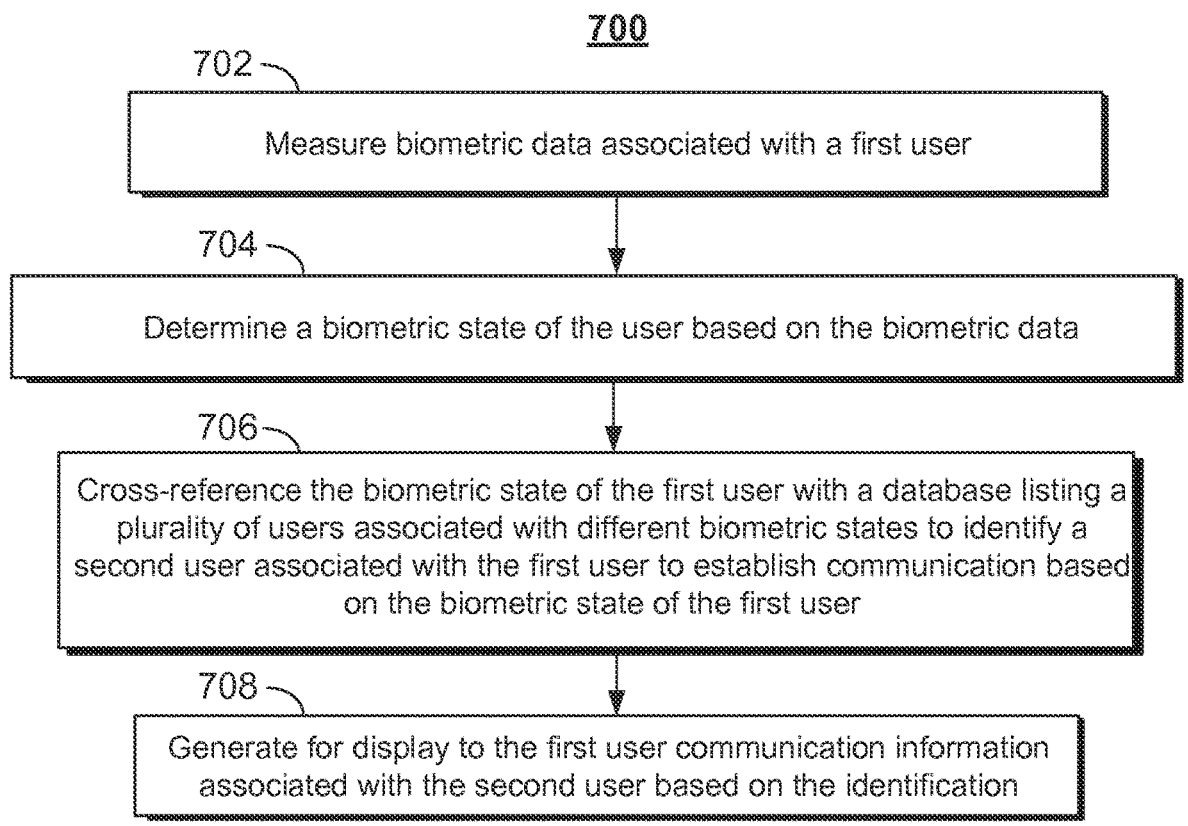
FIG. 7 is a flowchart of illustrative steps for establishing communication with a second user based on the biometric state a first user in accordance with some embodiments of the disclosure.
Figure 8:
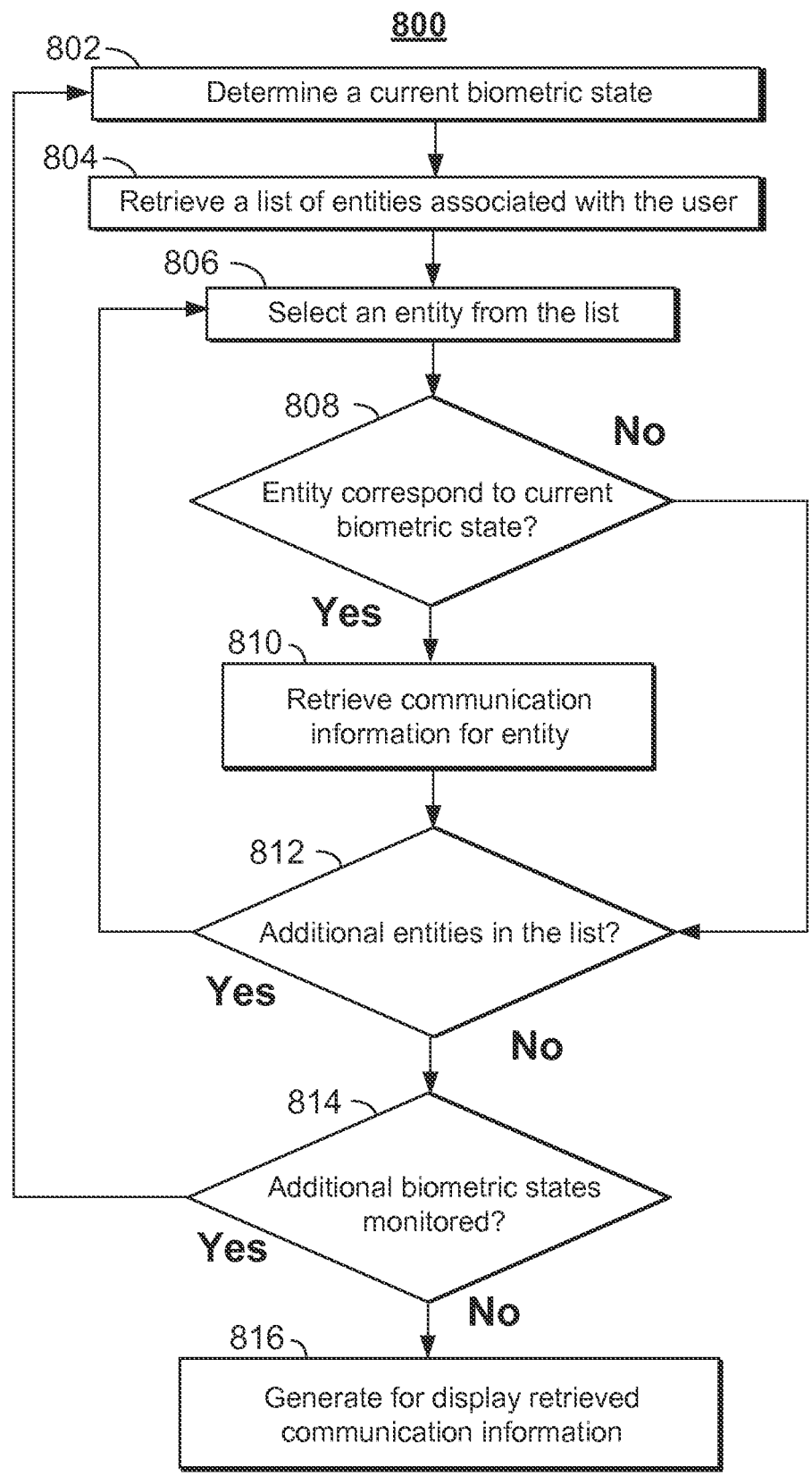
FIG. 8 is a flowchart of illustrative steps for generating for display communication information for all entities that correspond to the current biometric state of the user in accordance with some embodiments of the disclosure.

FIG. 5 is a flowchart of illustrative steps for enabling a media guidance application operation in response to determining that a current biometric state corresponds to a rule. It should be noted that process 500 or any step thereof could be performed on, or provided by, any of the devices shown in FIGS. 3-4. For example, process 500 may be executed by control circuitry 304 (FIG. 3) as instructed by a media guidance application implemented on a user device (e.g., user equipment devices 402, 404, and/or 406 (FIG. 4)) in order to determine whether or not a current biometric state corresponds to a rule. In addition, one or more steps of process 500 may be incorporated into or combined with one or more steps of any other process or embodiment (e.g., as shown in FIGS. 6-8).

At step 502, the media guidance application receives a rule set associated with desired biometric state or states of a user. For example, the media guidance application may receive a user input (e.g., via user input interface 310 (FIG. 3)) selecting a rule set (e.g., from window 204 (FIG. 2)) corresponding with a specific goal. For example, the media guidance application may receive a user input (e.g., from a parent) selecting a rule set corresponding with a specific goal (e.g., studying, exercising, not smoking, etc.) or biometric state of a user (e.g., a particular level of concentration) for a first user (e.g., a child).

Alternatively or additionally, the media guidance application may receive (e.g., via I/O path 302 (FIG. 3)) a rule set transmitted from a remote location (e.g., a remote user device), which accesses the media guidance application via a communications network (e.g., communications network 414 (FIG. 4)), that indicates the particular rule set that should be applied. For example, a remote device (e.g., operated by a parent) may set and/or customize the rule set that governs the media guidance application operations enabled/disabled based on the biometric state of the user.

Alternatively or additionally, the media guidance application may receive (e.g., from storage 308 (FIG. 3)) a rule set based on predetermined conditions. For example, the media guidance application may store one or more user profiles, each associated with a particular user, and each indicating one or more rule sets that should be applied to the user in given scenarios. For example, customizations to the rules, rule sets, and/or available media guidance application operations may be retrieved by the media guidance application upon the media guidance application identifying (e.g., manually via a user input through user input interface 310 (FIG. 3) or automatically via detection module 316 (FIG. 3)) a user.

In some embodiments, the media guidance application may apply the rules set based on particular conditions. For example, the rule set may be based on parental control settings entered on a remote device. In another example, the rule set may be automatically applied during a predetermined period time. For example, if a user is schedule to study for the next hour or be asleep at ten o'clock, the media guidance application may apply corresponding rules sets.

In some embodiments, a rule set may be applied in response to detecting a change in biometric data. For example, in response to a user's blood pressure increasing, the media guidance application may apply a rule set associated with lowering blood pressure.

In another example, the rule set may be automatically applied in response to determining the user is at a predetermined location. For example, the media guidance application may apply a first rule set while a user is a first location (e.g., a library, school, etc.) and a different rules set while the user is a second location (e.g., a baseball field, a friend's house, etc.). The location may also be relative to a particular object. For example, the media guidance application may determine the location of an object (e.g., a vehicle associated with the user) and apply a rule set (e.g., limiting the blood-alcohol level of the user) when the user is near the location of the object.

At step 504, the media guidance application (e.g., via control circuitry 304 (FIG. 3)) determines a media guidance application operation that is associated with adherence to the rule set. For example, the media guidance application operation may include an option related to a presentation volume of content (e.g., how loud music may be played), an option related to content that is presented (e.g., whether or not a media asset may be presented to the user), an option related to a the use of a user device (e.g., whether or not a user device can be user to make a telephone call), or an option related to a movement of the vehicle (e.g., where to, or how fast, the vehicle may move).

For example, the media guidance application may query a database, for example, located locally (e.g., on storage 308 (FIG. 3)) or remotely (e.g., at media content source 416 (FIG. 4), media guidance data source 418 (FIG. 4), and/or located at any location accessible via communications network 414 (FIG. 4)) to determine a media guidance application operation that is associated with adherence to the rule set. For example, the database may be structured as a look-up table. The media guidance application (e.g., via control circuitry 304 (FIG. 3)) may input a rule and/or rule set into the look-up table. The look-up table may then filter the results and output all media guidance application operations that correspond to the particular rule set.

For example, a rule set may indicate that a user may only make calls on a telephone when their heart rate is above normal (e.g., indicating that the user is in an emergency). Furthermore, the rule set may indicate that only particular telephone numbers and only telephone calls of a particular length may be made. In another example, a rule set may indicate that a user may only watch television if the user has been previously sitting still and/or has had at a high level of attention (e.g., corresponds to studying/doing homework) for the previous hour. In yet another example, a rule set may indicate that a user may only order food (e.g., using an online service or using a virtual wallet) when a particular biometric state (e.g., low blood sugar level) is achieved. Furthermore, the type and/or amount of food that the user can order may also be indicated by the rule set.

At step 506, the media guidance application cross-references the rule set with a database listing rules associated with rule sets to determine a rule that corresponds to the rule set. For example, each rule set may be associated with various rules also corresponding to fulfilment of the goal associated with the rule set. For example, if a rule set corresponds to proper biometric state of the user for a fourteen year old child, the rule set may include one or more rules indicating a that consuming alcohol or smoking is not permitted (e.g., an allowable blood alcohol level or nicotine level is zero percent).

Similar to step 504, the media guidance application may query a database that is located locally (e.g., on storage 308 (FIG. 3)) or remotely (e.g., at media content source 416 (FIG. 4), media guidance data source 418 (FIG. 4), and/or located at any location accessible via communications network 414 (FIG. 4)) to determine a rule that corresponds to a rule set. For example, the database may be structured as a look-up table. The media guidance application (e.g., via control circuitry 304 (FIG. 3)) may input a rule set into the look-up table. The look-up table may then filter the results and output all rules that correspond to the particular rule set.

At step 508, the media guidance application determines a current biometric state of the user. For example, the media guidance application may determine (e.g., via detection module 316 (FIG. 3)) the current biometric state of the user. For example, the media guidance application, or the user device (e.g., user equipment devices 402, 404, and/or 406 (FIG. 4)) upon which the media guidance application is implemented, may incorporate and/or have access to a plurality of sensors and/or monitoring components (e.g., detection module 316 (FIG. 3)). For example, the media guidance application, or the user device upon which the media guidance application is implemented, may incorporate and/or have access to a heart monitor, glucose blood meter, respiratory monitors, devices for obtaining tissue, blood, and/or any other suitable samples from a user, and/or any other devices necessary for determining the biometric measurements of the user.

At step 510, the media guidance application compares (e.g., via control circuitry 304 (FIG. 3)) the current biometric state of the user to the rule to determine whether the current biometric state of the user corresponds to the rule, and (e.g., via control circuitry 304 (FIG. 3)) enables or disables the media guidance application operation in response to determining (e.g., via control circuitry 304 (FIG. 3)) that the biometric state of the user corresponds to (or does not correspond to) the rule at step 612. For example, the biometric state of the user and the rule may be quantified into a particular value, the media guidance application may (e.g., via control circuitry 304 (FIG. 3)) then compare the values to determine whether the two values correspond.

For example, the media guidance application may quantify a rule set that indicates an average level of concentration a user must maintain over a period of time. The media guidance application may compare the average level of concentration to the actual level of concentration of the user (e.g., the brain state of the user) during that period of time. Based on a comparison, the media guidance application may determine whether or not one or more media guidance application operations are enabled on one or more user devices.

In some embodiments, the media guidance application may perform actions alternatively to, or in addition to, enabling or disabling a media guidance application operation. For example, in response to determining (e.g., via control circuitry 304 (FIG. 3)) a biometric state of the user is in violation of a rule, the media guidance application may (e.g., via control circuitry 304 (FIG. 3)) notify a user (or a third party) of a relationship between the current brain state and the rule (e.g., the rule that the user is currently in violation, of or a degree to which a user is violating the rule, etc.). For example, the media guidance application (e.g., via control circuitry 304 (FIG. 3)) may transmit a message to another device (e.g., operated by a parent) indicating that the user (e.g., a child) is violating a rule.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 5.

FIG. 6 is a flowchart of illustrative steps for modifying media guidance application operation(s) based on determined effects of the current biometric state of a user corresponding to one or more rules in a rule set. It should be noted that process 600 or any step thereof could be performed on, or provided by, any of the devices shown in FIGS. 3-4. For example, process 600 may be executed by control circuitry 304 (FIG. 3) as instructed by a media guidance application implemented on a user device (e.g., user equipment devices 402, 404, and/or 406 (FIG. 4)) in order to determine whether or not a current biometric state of a user corresponds to a rule. In addition, one or more steps of process 600 may be incorporated into or combined with one or more steps of any other process or embodiment (e.g., as shown in FIGS. 5 and 7-8).

At step 602, the media guidance application retrieves (e.g., via control circuitry 304 (FIG. 3)) a rule set. For example, the media guidance application may retrieve a rule set in response to receiving (e.g., via I/O path 302 (FIG. 3)) an instruction from a remote device (e.g., transmitting parental control settings). For example, the media guidance application may request the user provide identification (e.g., a password, key, biometric measurement, etc.). Upon identifying the user, the media guidance application may (e.g., via control circuitry 304 (FIG. 3)) retrieve (e.g., from storage 308 (FIG. 3) and/or any location accessible via communications network 414 (FIG. 4)) a user profile associated with a user that includes one or more rule sets associated with the user.

At step 604, the media guidance application detects a current biometric state. For example, as discussed above in step 508 (FIG. 6), the media guidance application may determine (e.g., via detection module 316 (FIG. 3)) the current biometric state through the use of one or more biometric monitoring devices (e.g., biometric monitoring equipment 402 (FIG. 4)).

At step 606, the media guidance application retrieves a rule from the rule set. For example, the rule set may include one or more rules, or may itself include one or more rule sets. The media guidance application (e.g., via control circuitry 304 (FIG. 3)) retrieves a rule for the rule set to compare it to current biometric state at step 608. If the current biometric state corresponds to the rule set, the media guidance application proceeds to step 610 and determines an effect that not corresponding to the rule set has on one or more media guidance application operations. For example, in response to determining (e.g., via detection module 316 (FIG. 3) coupled to control circuitry 304 (FIG. 3)) that a user is inebriated (e.g., in violation of a rule of a rule set), the media guidance application may no longer allow a user to access an in-vehicle stereo system. In response to determining (e.g., via detection module 316 (FIG. 3) coupled to control circuitry 304 (FIG. 3)) that a user is smoking (e.g., in violation of another rule of a rule set), the media guidance application may no longer allow a user to consume media assets on a user device. In response to determining (e.g., via detection module 316 (FIG. 3) coupled to control circuitry 304 (FIG. 3)) that a user is not asleep during the scheduled bedtime of the user (e.g., in violation of yet another rule of a rule set), the media guidance application disable the Internet connection to a user device associated with the user.

At step 612, the media guidance application determines whether or not there are any additional rules in the rule set. For example, the media guidance application (e.g., via control circuitry 304 (FIG. 3)) may perform one or more iterations of comparing a retrieved rule to a current biometric state. If the media guidance application determines (e.g., via control circuitry 304 (FIG. 3)) that there are additional rules, the media guidance application returns to step 606. If the media guidance application determines (e.g., via control circuitry 304 (FIG. 3)) that there are no additional rules in the rule set, the media guidance application proceeds to step 614.

At step 614, the media guidance application determines whether or not there are any additional biometric states being monitored. For example, the media guidance application (e.g., via control circuitry 304 (FIG. 3)) may perform one or more iterations of comparisons of retrieved rules to detected biometric states. If the media guidance application determines (e.g., via control circuitry 304 (FIG. 3)) that there are additional biometric states being monitored or detected, the media guidance application returns to step 604. If the media guidance application determines (e.g., via control circuitry 304 (FIG. 3)) that there are no additional biometric states being monitored or detected, the media guidance application proceeds to step 616, and at step 616, the media guidance application (e.g., via control circuitry 304 (FIG. 3)) enables or disables one or more available media guidance application operations based on the determined effects.

In some embodiments, the media guidance application (e.g., via control circuitry 304 (FIG. 3)) may perform actions alternative to, or in addition to, enabling or disabling a media guidance application operation. For example, in response to determining (e.g., via control circuitry 304 (FIG. 3)) a current biometric state of a user is in violation of a rule, the media guidance application may (e.g., via control circuitry 304 (FIG. 3)) notify the user (or a third party) of a relationship between the current biometric state and the rule (e.g., the rule of which the user is currently in violation, or a degree to which a user is violating the rule, etc.).

In some embodiments, the actions alternatively to, or in addition to, enabling or disabling a media guidance application operation may include generic punishments. As used herein, a "generic punishment" refers to an action taken by the media guidance application to coerce a particular biometric state of the user. For example, in response to determining (e.g., via control circuitry 304 (FIG. 3)) a biometric state of the user is in violation of a rule, the media guidance application may (e.g., via control circuitry 304 (FIG. 3)) publicly distribute (e.g., via a posting on a social network) embarrassing pictures related to a user. For example, the media guidance application may receive data (e.g., metadata) indicating that a media asset is embarrassing and/or has one or more characteristics of an embarrassing media asset (e.g., the media asset may include an image of the user in which the user is out-of-focus, has his or her eyes closed, etc.). Alternatively, the media guidance application may (e.g., via detection module 316 (FIG. 3)) determine (e.g., via one or more object recognition technique discussed above) that the contents of the media asset are embarrassing to the user.

Alternatively or additionally, the media guidance application may request (e.g., via control circuitry 304 (FIG. 3)) a media asset from a local database (e.g., storage 308 (FIG. 3)) or a remote database (e.g., any device accessible via communications network 414 (FIG. 4)) that is associated with embarrassing media assets of a user. For example, in response to determining that a user is smoking (e.g., in violation of a rule), the media guidance application may retrieve an embarrassing message related to the rule (e.g., "Joe wants to die of lung cancer") and publicaly distribute the message. For example, a third party (e.g., a parent) may upload embarrassing media assets of a user (e.g., a child) to the database. The third party may indicate that each media asset is embarrassing and/or indicate what media asset should be publically distributed in response to particular violations.

In another example, in response to determining (e.g., via control circuitry 304 (FIG. 3)) a current biometric state of the user is in violation of a rule, the media guidance application may (e.g., via control circuitry 304 (FIG. 3)) delete media assets (e.g., stored in storage 308 (FIG. 3)) associated with the user or fail to take actions (e.g., record a media asset scheduled to be recorded) requested by the user. Additionally or alternatively, the media guidance application may determine (e.g., via control circuitry 304 (FIG. 3)) that a media asset corresponds to a favorite program of the user. For example, the media guidance application may (e.g., via control circuitry 304 (FIG. 3)) compare attributes associated with stored media assets to user preferences (e.g., retrieved from a user profile stored in storage 308 (FIG. 3)). In response to determining that a particular media asset corresponds to the user preferences, the media guidance application may (e.g., via control circuitry 304 (FIG. 3)) delete the media asset (e.g., from storage 308 (FIG. 3)) or cancel a scheduled recording.

In another example, in response to determining (e.g., via control circuitry 304 (FIG. 3)) a current biometric state of the user is in violation of a rule, the media guidance application may (e.g., via control circuitry 304 (FIG. 3)) charge an account associated with the user a fixed fee. For example, the media guidance application may (e.g., via control circuitry 304 (FIG. 3)) retrieve a fixed fee (e.g., as indicated in a database located at storage 308 (FIG. 3) and/or any location accessible via communications network 414 (FIG. 4)) that should be attributed to the account of a user based on the violation. Upon determining that the current biometric state of the user is in violation of the rule (e.g., via control circuitry 304 (FIG. 3)), the media guidance application may (e.g., via control circuitry 304 (FIG. 3)) charge an account associated with the user the determined fixed fee.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

FIG. 7 is a flowchart of illustrative steps for establishing communication with a second user based on the biometric state a first user. It should be noted that process 700 or any step thereof could be performed on, or provided by, any of the devices shown in FIGS. 3-4. For example, process 700 may be executed by control circuitry 304 (FIG. 3) as instructed by a media guidance application implemented on a user device (e.g., user equipment devices 402, 404, and/or 406 (FIG. 4)) in order to establish communication with a second user based on the biometric state a first user. In addition, one or more steps of process 700 may be incorporated into or combined with one or more steps of any other process or embodiment (e.g., as shown in FIGS. 5-6 and 8).

In step 702, the media guidance application measures (e.g., using detection module 316 (FIG. 3)) biometric data associated with a first user. For example, the media guidance application may receive (e.g., via I/O path 302 (FIG. 3)) data from a biometric monitoring device attached to, worn by, or held by the user. As discussed above in relation to step 508 (FIG. 5), the media guidance application, or the user device (e.g., user equipment devices 402, 404, and/or 406 (FIG. 4)) upon which the media guidance application is implemented, may incorporate and/or have access to a plurality of sensors and/or monitoring components (e.g., detection module 316 (FIG. 3)) for determining biometric data (e.g., a current biometric state) associated with the first user. For example, the media guidance application, or the user device upon which the media guidance application is implemented, may incorporate and/or have access to a heart monitor, glucose blood meter, respiratory monitors, devices for obtaining tissue, blood, and/or any other suitable samples from a user, and/or any other devices necessary for determining the biometric measurements of the user.

At step 704, the media guidance application determines (e.g., via control circuitry 304 (FIG. 3)) a biometric state of the first user based on the biometric data. For example, the media guidance application may interpret (e.g., via control circuitry 304 (FIG. 3)) the biometric data to determine whether or not the heart rate of the user is elevated, whether or not a user is concentrating, etc. For example, the media guidance application may determine whether or not a current biometric state of the user is higher, lower, etc. compared to a baseline biometric state of the user (e.g., retrieved from storage 308 or any location accessible via communications network 414 (FIG. 4))) or relative to a baseline biometric state of average users (e.g., retrieved from storage 308 or any location accessible via communications network 414 (FIG. 4)).

At step 706, the media guidance application cross-references (e.g., via control circuitry 304 (FIG. 3)) the biometric state of the first user with a database (e.g., located at storage 308 or any location accessible via communications network 414 (FIG. 4)) listing a plurality of users associated with different biometric states to identify a second user associated with the first user to establish communication based on the biometric state of the first user. For example, the database may list of entities such as friends (e.g., a social network buddy list), contacts (e.g., retrieved from a phone/text message/e-mail account associated with the user), and/or public services (e.g., hospitals, police departments, schools, etc.) with known associations to the user or the community of the user. The media guidance application (e.g., via control circuitry 304 (FIG. 3)) may filter the list of entities based on whether or not establishing communication with the particular entity corresponds to the biometric state of the user. For example, in addition to storing the name and communication information associated with each entity, the database may indicate biometric states that correspond to each entity.

For example, if the biometric state of the user corresponds to a blood-alcohol level of 0.02 (e.g., indicating that the user has been consuming alcohol), the media guidance application may establish communication with a friend or family member of the user. If the biometric state of the user corresponds to a drop, or lack thereof, in the breath rate of the user (e.g., indicate the user has stopped breathing), the media guidance application may establish communication with a hospital. If the biometric state of the user corresponds to an increase in the heart rate of the user (e.g., indicating the user is in danger), the media guidance application may establish communication with the police.

At step 708, the media guidance application generates for display to the first user (e.g., via control circuitry 304 (FIG. 3)) communication information (e.g., retrieve from storage 308 (FIG. 3) or any location accessible via communications network 414 (FIG. 4)) associated with the second user based on the identification. For example, in response to determine a particular user or entity to contact, the media guidance application may transmit a mailing address, an e-mail address, a web-site address, a telephone number, etc. for the particular user or entity to a user device (e.g., a smartphone) detected to be associated with the user.

In some embodiments, the media guidance application may generate for display (e.g., via control circuitry 304 (FIG. 3)) a list of a plurality of users or entities each of which corresponds to the biometric state of the user (and/or the communication information for each entity). For example, in response to determining that a user is excited, the media guidance application may present a list of all of the friends of a user (e.g., as indicated by a social network associated with the user). In another example, in response to determining that a user has stopped breathing, the media guidance application may present a list of all of hospitals near the current position of the user (e.g., as determined based on GPS components associated with detection module 316 (FIG. 3)).

In some embodiments, the media guidance application may additionally establish communication with the second user in response to a user input. For example, after generating for display to the first user (e.g., via control circuitry 304 (FIG. 3)) the communication information associated with the second user, the media guidance application may receive a user request (e.g., via user input interface 310 (FIG. 3)) to contact the second user. Based on this request, the media guidance application (e.g., via control circuitry 304 (FIG. 3)) establishes communications with (e.g., calls) the second user.

In some embodiments, the media guidance application may automatically (e.g., via control circuitry 304 (FIG. 3)) establish communication with the second user based on the biometric state of the first user. For example, the media guidance application may automatically contact a user after the communication information has been generated for display a particular amount of time. Alternatively or additionally, the media guidance application may determine whether or not to automatically contact the second user based on the biometric state of the user. For example, if the media guidance application determines (e.g., via control circuitry 304 (FIG. 3)) that the biometric state of the user inhibits from requesting to contact the second user (e.g., the user in unconscious), the media guidance application may automatically contact the second user (e.g., via control circuitry 304 (FIG. 3)).

In some embodiments, the media guidance application may determine (e.g., via control circuitry 304 (FIG. 3)) a communication method for establishing communication with the second user based on an identity of the second user. For example, the media guidance application may determine that a particular user (e.g., a parent) prefers (e.g., as indicated by a user profile or user preference stored in storage 308 (FIG. 3) and/or at any location accessible via communications network 414 (FIG. 4)) to receive communications via a telephone call, whereas a different user (e.g., a friend) prefers to receive communications via text message. Additionally or alternatively, the media guidance application may determine (e.g., via control circuitry 304 (FIG. 3)) a communication method for establishing communication with the second user based on biometric state of the user. For example, if the media guidance application determines (e.g., via control circuitry 304 (FIG. 3)) that the biometric state of the user is not conducive to speaking (e.g., the user is inebriated), the media guidance application may determine (e.g., via control circuitry 304 (FIG. 3)) to communicate via text message.

In some embodiments, the media guidance application may determine (e.g., via control circuitry 304 (FIG. 3)) a message to be communicated the second user based on the biometric state of the first user. For example, the media guidance application may determine (e.g., via control circuitry 304 (FIG. 3)) to send a message inviting a user to join the first user on a jog in response to determining (e.g., via control circuitry 304 (FIG. 3)) the user is jogging based on the biometric data. In another example, the media guidance application may determine (e.g., via control circuitry 304 (FIG. 3)) to post a message to the first user's social network page inviting other users to join the first user in drinking alcohol in response to determining (e.g., via control circuitry 304 (FIG. 3)) the user is inebriated based on the biometric data.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

FIG. 8 is a flowchart of illustrative steps for generating for display communication information for all entities that correspond to the current biometric state of the user in accordance with some embodiments of the disclosure. It should be noted that process 700 or any step thereof could be performed on, or provided by, any of the devices shown in FIGS. 3-4. For example, process 700 may be executed by control circuitry 304 (FIG. 3) as instructed by a media guidance application implemented on a user device (e.g., user equipment devices 402, 404, and/or 406 (FIG. 4)) in order to establish communication with a second user based on the biometric state a first user. In addition, one or more steps of process 700 may be incorporated into or combined with one or more steps of any other process or embodiment (e.g., as shown in FIGS. 5-6 and 8).

At step 802, the media guidance application determines (e.g., via control circuitry 304 (FIG. 3)) a current biometric state of the user. For example, the media guidance application may measure biometric data using a biometric monitoring device (e.g., detection module 316 (FIG. 3)) attached to, worn by, or held by the user. As discussed above in relation to step 702 (FIG. 7), the media guidance application, or the user device (e.g., user equipment devices 402, 404, and/or 406 (FIG. 4)) upon which the media guidance application is implemented, may incorporate and/or have access to a plurality of sensors and/or monitoring components (e.g., detection module 316 (FIG. 3)) for determining biometric data (e.g., a current biometric state) associated with the first user. For example, the media guidance application, or the user device upon which the media guidance application is implemented, may incorporate and/or have access to a heart monitor, glucose blood meter, respiratory monitors, devices for obtaining tissue, blood, and/or any other suitable samples from a user, and/or any other devices necessary for determining the biometric measurements of the user. The media guidance application may then interpret (e.g., via control circuitry 304 (FIG. 3)) the biometric data to determine a current biometric state of the user.

At step 804, the media guidance application retrieves (e.g., via control circuitry 304 (FIG. 3)) a list of entities associated with the user. For example, as discussed in step 706 (FIG. 7), the user may be associated with one or more entities (e.g., as indicated by a user profile located at storage 308 or any location accessible via communications network 414 (FIG. 4)). For example, the entities may include friends (e.g., a social network buddy list), contacts (e.g., retrieved from a phone/text message/e-mail account associated with the user), and/or public services (e.g., hospitals, police departments, schools, etc.) with known associations to the user or the community of the user.

At step 806, the media guidance application selects (e.g., via control circuitry 304 (FIG. 3)) an entity from the list and determines whether or not the entity corresponds to a current biometric state of the user at step 808. For example, the media guidance application (e.g., via control circuitry 304 (FIG. 3)), in addition to storing the name of the entity store one or more biometric states that correspond to the entity. At step 808, the media guidance application determines (e.g., via control circuitry 304 (FIG. 3)) whether or not the selected entity corresponds to the current biometric state.

If the current biometric state corresponds to the entity at step 808, the media guidance application proceeds to step 810. For example, in response to determining (e.g., via detection module 316 (FIG. 3) coupled to control circuitry 304 (FIG. 3)) that a user is inebriated (e.g., has a biometric state corresponding to a blood-alcohol level of 1.0), the media guidance application may determine whether or not the entity is associated with that biometric state. If the current biometric state does not correspond to the entity at step 808, the media guidance application proceeds to step 814.

At step 810, the media guidance application retrieves (e.g., from storage 308 (FIG. 3) and/or at any location accessible via communications network 414 (FIG. 4)) communication information associated with the entity. For example, the media guidance application may determine (e.g., via control circuitry 304 (FIG. 3)) the communication information associated with the entity.

At step 812, the media guidance application determines whether or not there are any additional entities in the list. For example, the media guidance application (e.g., via control circuitry 304 (FIG. 3)) may perform one or more iterations of comparing a current biometric state to an entity associated with a user. If the media guidance application determines (e.g., via control circuitry 304 (FIG. 3)) that there are additional entities, the media guidance application returns to step 806. If the media guidance application determines (e.g., via control circuitry 304 (FIG. 3)) that there are no additional entities in the list, the media guidance application proceeds to step 814.

At step 814, the media guidance application determines whether or not there are any additional biometric states being monitored. For example, the media guidance application (e.g., via control circuitry 304 (FIG. 3)) may perform one or more iterations of comparisons of each of the entities in the list to determine different biometric states. If the media guidance application determines (e.g., via control circuitry 304 (FIG. 3)) that there are additional biometric states being monitored, the media guidance application returns to step 802. If the media guidance application determines (e.g., via control circuitry 304 (FIG. 3)) that there are no additional biometric states being monitored, the media guidance application proceeds to step 816, and at step 816, the media guidance application (e.g., via control circuitry 304 (FIG. 3)) generates for display retrieved communication information for all the entities corresponding to one or more current biometric states of the user.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 8.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for enabling media guidance application operations based on biometric data, the method comprising:
   accessing a plurality of rules, using control circuitry, wherein each rule of the plurality of rules is associated with (a) a respective biometric state of a user, (b) a respective pre-defined geographical location of the user, and (c) a respective media guidance application operation;
   determining, using the control circuitry, a current geographical location of the user;
   determining, using the control circuitry, that the current geographical location of the user corresponds to a pre-defined geographical location;
   identifying a rule of the plurality of rules associated with the pre-defined geographical location;
   determining, using the control circuitry, that a current biometric state of the user at the current geographical location corresponds with a biometric state of the user associated with the identified rule;
   and
   in response to determining that the current biometric state of the user corresponds to the biometric state of the user associated with the identified rule, enabling the media guidance application operation associated with the identified rule.

2. The method of claim 1, further comprising, in response to determining that the current biometric state of the user does not correspond with the biometric state of the user associated with the identified rule, disabling the media guidance application operation.

3. The method of claim 1, further comprising, in response to determining that the current biometric state of the user does not correspond with the biometric state of the user associated with the identified rule:
retrieving a list of media assets stored on storage circuitry of the user; and
automatically removing, from the storage circuitry, a media asset identified to have at least one attribute that matches a preference of the user.

4. The method of claim 1, further comprising generating for presentation a notification of a relationship between the current biometric state of the user and the biometric state of the user associated with the identified rule.

5. The method of claim 1, wherein the identified rule is based on parental control settings entered on a remote device.

6. The method of claim 1, wherein the identified rule is automatically applied during a predetermined time period.

7. The method of claim 1, wherein each rule of the plurality of rules is further associated with (d) an object corresponding to the user, wherein the identified rule is automatically applied in response to determining that the user is at a predetermined distance from the object.

8. The method of claim 1, wherein determining the current biometric state of the user involves receiving data from a device attached to the user.

9. The method of claim 1, wherein the media guidance application operation includes an option related to accessing media content.

10. The method of claim 1, further comprising:
detecting a mobile user device associated with the user; and
disabling the media guidance application operation on the mobile user device in response to determining that the current biometric state of the user does not correspond with the biometric state of the user associated with the identified rule.

11. A system for enabling media guidance application operations based on biometric data, the system comprising:
storage circuitry configured to:
store a plurality of rules, wherein each respective rule of the plurality of rules is associated with (a) a respective biometric state of a user, (b) a respective pre-defined geographical location of the user, and (c) a respective media guidance application operation; and
control circuitry configured to:
access the plurality of rules;
determine, using the control circuitry, a current geographical location of the user;
determine using the control circuitry, that the current geographical location of the user corresponds to a pre-defined geographical location;
identify a rule of the plurality of rules associated with the pre-defined geographical location;
determine, using the control circuitry, a current biometric state of the user;
determine, using the control circuitry, that the current biometric state of the user at the current geographical location corresponds with a biometric state of the user associated with the identified rule; and
enable the media guidance application operation associated with the identified rule in response to determining that the current biometric state of the user corresponds to the biometric state of the user associated with the identified rule.

12. The system of claim 11, wherein the control circuitry is further configured to, in response to determining that the current biometric state of the user does not correspond with a biometric state of the user associated with the identified rule:
retrieve a list of media assets stored on storage circuitry of the user; and
automatically remove, from the storage circuitry, a media asset identified to have at least one attribute that matches a preference of the user.

13. The system of claim 11, wherein the control circuitry is further configured to transmit an alert to a remote device in response to determining that the current biometric state of the user does not correspond with a biometric state of the user associated with the identified rule.

14. The system of claim 11, wherein the control circuitry is further configured to generate for presentation a notification of a relationship between the current biometric state of the user and the biometric state of the user associated with the identified rule.

15. The system of claim 11, wherein the identified rule is based on parental control settings entered on a remote device.

16. The system of claim 11, wherein the identified rule is automatically applied during a predetermined time period.

17. The system of claim 11, wherein each rule of the plurality of rules is further associated with (d) an object corresponding to the user, wherein the identified rule is automatically applied in response to determining that the user is at a predetermined distance from the object.

18. The system of claim 11, wherein the control circuitry is further configured to receive biometric data from a device attached to the user.

19. The system of claim 11, wherein the media guidance application operation includes an option related to accessing media content.

20. The system of claim 11, wherein the control circuitry is further configured to:
detect a mobile user device associated with the user; and
disable the media guidance application operation on the mobile user device in response to determining that the current biometric state of the user does not correspond with a biometric state of the user associated with the identified rule.

* * * * *